United States Patent
Hubert (10) Patent No.: US 11,378,050 B2
(45) Date of Patent: Jul. 5, 2022

(54) WHEELED VEHICLE PROVIDED WITH AN AUTOMATIC STOP FUNCTION FOR STOPPING THE HEAT ENGINE AND METHOD FOR OPTIMIZING STOPPAGE CONDITIONS OF SUCH A VEHICLE

(71) Applicant: MANITOU BF, Ancenis (FR)

(72) Inventor: Fabrice Hubert, Ancenis (FR)

(73) Assignee: MANITOU BF, Ancenis (FR)

( * ) Notice: Subject to any disclaimer, the term of this patent is extended or adjusted under 35 U.S.C. 154(b) by 19 days.

(21) Appl. No.: 17/050,032

(22) PCT Filed: Apr. 23, 2019

(86) PCT No.: PCT/FR2019/050960
§ 371 (c)(1),
(2) Date: Oct. 23, 2020

(87) PCT Pub. No.: WO2019/207247
PCT Pub. Date: Oct. 31, 2019

(65) Prior Publication Data
US 2021/0254592 A1    Aug. 19, 2021

(30) Foreign Application Priority Data

Apr. 26, 2018 (FR) ........................ 1853677

(51) Int. Cl.
*F02N 11/08*    (2006.01)
*B66F 11/04*    (2006.01)
(Continued)

(52) U.S. Cl.
CPC .......... *F02N 11/084* (2013.01); *B66F 11/046* (2013.01); *B66F 17/006* (2013.01); *F02B 63/042* (2013.01); *F02N 11/0803* (2013.01)

(58) Field of Classification Search
CPC . B60W 2040/0881; B60W 2050/0075; B60W 2050/0093; B60W 2510/30;
(Continued)

(56) References Cited

U.S. PATENT DOCUMENTS

| 6,789,519 B1 * | 9/2004 | Bell | ................... B66F 11/044 |
| | | | 123/179.2 |
| 9,387,861 B1 * | 7/2016 | Lurie | ................... B64C 13/044 |

(Continued)

FOREIGN PATENT DOCUMENTS

| CN | 107709114 A | 2/2018 | |
| DE | 102009018974 | 10/2010 | |
| EP | 1526276 | * 4/2005 | ............. F02N 11/08 |

OTHER PUBLICATIONS

CN Office Action dated Nov. 24, 2021.
International Search Report dated Jul. 25, 2019.

*Primary Examiner* — Carl C Staubach
(74) *Attorney, Agent, or Firm* — Ipsilon USA, LLP (57) ABSTRACT

The invention relates to a wheeled vehicle (1) comprising: a chassis (2) carrying an engine (4), a starter (5) of the engine and a device for actuating said starter (5), a control unit, and an activatable/deactivatable device for energising the control unit, said vehicle (1) having an economical operating mode in which, in the activated state of the energising device, the control unit is designed to allow the motor (4) to be stopped without actuation of the energising device, said stoppage being called energised stoppage of the engine (4). The vehicle (1) comprises a memory for storing data relating to the number of starts of the engine (4) and the control unit is designed to allow or prohibit the energised stoppage of the engine (4), in the economical operating mode, according to said stored data.

14 Claims, 9 Drawing Sheets

(51) Int. Cl.
    *B66F 17/00*     (2006.01)
    *F02B 63/04*     (2006.01)

(58) Field of Classification Search
    CPC ......... B60W 2556/10; B60W 30/18018; F02B 63/042; F02N 11/0803; F02N 11/0818; F02N 11/084; F02N 2200/106; F02N 2200/01
    See application file for complete search history.

(56) References Cited

U.S. PATENT DOCUMENTS

| | | | |
|---|---|---|---|
| 11,180,354 B2* | 11/2021 | Hubert | F02N 11/0825 |
| 2009/0043429 A1* | 2/2009 | Minekawa | F01P 5/04 |
| | | | 701/1 |
| 2013/0345952 A1* | 12/2013 | Tsumori | F02N 11/0818 |
| | | | 701/113 |
| 2014/0121865 A1* | 5/2014 | Anderson | B60W 20/40 |
| | | | 701/22 |
| 2015/0183435 A1* | 7/2015 | Johnson | F02N 19/10 |
| | | | 701/112 |
| 2018/0306158 A1* | 10/2018 | Books | F02N 11/108 |
| 2019/0210854 A1* | 7/2019 | Eck | G05G 5/05 |
| 2019/0219018 A1* | 7/2019 | Books | F02N 11/0825 |
| 2020/0191069 A1* | 6/2020 | Naidu | B60W 30/18054 |
| 2021/0078844 A1* | 3/2021 | Hubert | B66F 11/044 |

* cited by examiner

WHEELED VEHICLE PROVIDED WITH AN AUTOMATIC STOP FUNCTION FOR STOPPING THE HEAT ENGINE AND METHOD FOR OPTIMIZING STOPPAGE CONDITIONS OF SUCH A VEHICLE

RELATED APPLICATION

This application is a National Phase of PCT/FR2019/050960 filed on Apr. 23, 2019 which claims the benefit of priority from French Patent Application No. 18 53677, filed on Apr. 26, 2018, the entirety of which are incorporated by reference.

FIELD OF THE INVENTION

The invention relates to a wheeled vehicle equipped with an automatic heat engine stop functionality and a method for optimizing the stopping conditions of such a vehicle.

It relates more particularly to a wheeled vehicle comprising:
- a chassis, a heat engine borne by said chassis, a starter of said engine and at least one member for actuating said starter,
- a control unit,
- a member for energizing at least the control unit, said energizing member being able to switch from an active state to an inactive state and vice versa, said vehicle comprising a so-called economical operating mode in which, in the activated state of the energizing member and in the started state of the engine, the control unit is configured to allow the engine to be stopped automatically, that is to say without actuation of the energizing member, said stopping being called energized stopping of the engine.

PRIOR ART

Vehicles equipped with a functionality for automatically stopping and subsequently starting or restarting the engine, commonly referred to as "STOP AND START", are well known to those skilled in this art.

The automatic stopping and subsequent starting of the engine are conditioned on criteria which can be linked to the behavior of the driver and to the actions that he or she undertakes and/or to intrinsic parameters linked to the state of the vehicle. The result of such a functionality for automatically stopping and subsequently starting the engine is a reduction of the total cost of ownership (TCO) and, when the vehicle is stopped, a reduction of fuel consumption. However, these successive stops and starts are likely to create premature wear of the engine and of the associated starter.

AIM AND SUMMARY OF THE INVENTION

One aim of the invention is to propose a wheeled vehicle whose design makes it possible to automatically stop and start the engine of said vehicle while limiting the risks of premature damage to the engine and to the associated starter.

To this end, the subject of the invention is a wheeled vehicle comprising:
- a chassis, a heat engine borne by said chassis, a starter of said engine and at least one member for actuating said starter,
- a control unit,
- a member for energizing at least the control unit, said energizing member being able to switch from an active state to an inactive state and vice versa, said vehicle comprising a so-called economical operating mode in which, in the activated state of the energizing member and in the started state of the engine, the control unit is configured to allow the engine to be stopped automatically, that is to say without actuation of the energizing member, said stopping being called energized stopping of the engine, characterized in that the wheeled vehicle comprises a memory for storing data relating to the number of starts of the heat engine of the vehicle and in that the control unit is configured to, in the economical operating mode of the vehicle, allow or prohibit the energized stopping of the engine at least according to said stored data.

The possibility of storing the number of starts of the engine makes it possible to then associate this datum with other data to allow or not allow the energized stopping of the engine, this stopping being able to be applied automatically in predefined conditions.

According to one embodiment of the invention, in the economical operating mode, the control unit is configured to, in the energized stopped state of the engine, start the engine without actuation of the at least one member for actuating the starter. The vehicle is therefore provided with a so-called automatic engine restart functionality that can be applied in predefined conditions.

According to one embodiment of the invention, the wheeled vehicle comprises a memory for storing data relating to the elapsed energized time T of the vehicle since it was put into service, said energizing of the vehicle corresponding to the active state of the energizing member, and the control unit is configured to, in the economical operating mode of the vehicle, allow or prohibit the energized stopping of the engine at least according to said stored data.

Thus, in this embodiment of the invention, preferably, the control unit is configured to:
- calculate the number D of starts of the vehicle since it was put into service over the elapsed energized time T of the vehicle since it was put into service,
- compare the result of the calculation with a stored predetermined threshold value, and
- authorize the energized stopping of the engine at least when the result of the calculation is below the stored predetermined threshold value.

The result thereof is an absence of authorization of an automatic stopping of the engine at least when, for example, the number of starts per hour is greater than a predetermined threshold value. However, it is possible in these conditions, for a vehicle which accumulates a large number of operating hours for a low number of starts, to have, over a short time period, a large number of starts.

That is why, according to one embodiment of the invention, the wheeled vehicle comprises a memory for storing each time value relating to the elapsed energized time between two successive starts of the heat engine and the control unit is configured to, n being an integer number greater than or equal to 1.
- calculate the sum of the last n stored time values with the time value relating to the elapsed energized time since the current start,
- compare said calculated value with a predefined threshold value, and,
- authorize the energized stopping of the engine at least according to the result of the comparison.

It is thus possible with this condition to avoid a very large number of automatic stops and, consequently, of starts of the engine accumulated over a very short time.

According to one embodiment of the invention, the vehicle energizing member is a key disposed on the chassis, this key being a rotary key that can switch by rotation from an inactive state to an active state and vice versa.

According to one embodiment of the invention, the chassis is equipped with a control station and the or at least one of the members for actuating the starter is formed by a start button with which said station is equipped.

According to one embodiment of the invention, the vehicle is a cherry picker comprising:

in addition to the chassis bearing said heat engine,
a platform,
means for lifting the platform relative to the chassis, said lifting means comprising at least one telescopic or non-telescopic lifting arm disposed between a zone of connection to the platform and the chassis and mounted to be movable using the heat engine between a high position and a low position,
a control console borne by said platform and equipped at least with a control of the lifting means,
a member for activating/deactivating at least the control of the lifting means, said activating/deactivating member being mounted to be movable between an inactive position, in which at least the control of the lifting means is deactivated and an active position in which at least the control of the lifting means is activated, said activating/deactivating member being equipped with means for return to the inactive position, and being able to switch from the inactive position to the active position under the action of a thrust exerted on said activating/deactivating member against the return means, and
an indicator of the active/inactive position of the activating/deactivating member,
the control unit is configured to control the lifting means according at least to the to data supplied by said control console, said cherry picker has two configurations, namely a transport configuration and a working configuration, said cherry picker being in transport configuration in low position of the arm and retracted position of the arm in the case of a telescopic arm, and in the working configuration of the cherry picker, and in the economical operating mode, the control unit is configured to, in the authorized state of energized stopping of the engine, control the energized stopping of the heat engine at least according to the data supplied by said indicator of the active/inactive position of the member for activating/deactivating at least the control of the lifting means.

Thus, in such an embodiment, the control unit is, in the authorized state of the energized stopping of the engine, configured to control the energized stopping of the engine at least if the activating/deactivating member is in inactive position.

In this embodiment, in the working configuration of the cherry picker and in the economical operating mode, in the energized stopped state of the heat engine, the control unit is configured to control the starting of the heat engine using the member for activating/deactivating at least the control of the lifting means, by switching the activating/deactivating member from the inactive position to the active position, without actuation of the member or members for actuating the starter. The result thereof is simplicity of restarting.

According to one embodiment of the invention, the control unit comprises a presence determination module configured to determine the presence or absence state of a person on the platform according to data supplied by the control console and, in the working configuration of the cherry picker, in the economical operating mode, the control unit is configured to, in the authorized state of energized stopping of the engine, control the energized stopping of the heat engine at least according to said state determined by the presence determination module. Thus, preferably, the control unit is configured to control the energized stopping of the engine at least in the state of presence of a person on the platform.

According to one embodiment of the invention, the vehicle comprises an activatable/deactivatable member for controlling the cold starting of the heat engine and a module for determining the activated/deactivated state of said control member, this control member being able to be activated by manual actuation, and being able to be deactivated automatically, and, in the economical operating mode, the control unit is configured to, in the authorized state of energized stopping of the engine, control the energized stopping of the heat engine at least according to the activated/deactivated state of said cold start control member determined by said module. Thus, preferably, the control unit is configured to control the energized stopping of the engine at least in the deactivated state of said cold start control member.

According to one embodiment of the invention, the vehicle comprises at least one electricity generator, and a module for determining the activated/deactivated state of said electricity generator and, in the economical operating mode, the control unit is configured to, in the authorized state of energized stopping of the engine, control the energized stopping of the heat engine at least according to the activated/deactivated state of the electricity generator determined by said module. Thus, preferably, the control unit is configured to control the energized stopping of the engine at least in the activated state of the electricity generator.

According to one embodiment of the invention, the economical operating mode is an activatable/deactivatable mode and the vehicle comprises a member for activating and/or deactivating said mode.

As a variant, the economical operating mode can be activated by default, when the engine is started by actuation of the member for actuating the starter.

Another subject of the invention is a method for optimizing the stopping conditions of a wheeled vehicle comprising
a chassis, a heat engine borne by said chassis,
a starter of said engine and at least one member for actuating said starter,
a control unit,
a member for energizing at least the control unit, said energizing member being able to switch from an active state to an inactive state and vice versa, said vehicle comprising, in the activated state of the energizing member and in the started state of the engine, a so-called economical operating mode in which the control unit is configured to allow the engine to be stopped automatically, that is to say without actuation of the energizing member, said stopping being called energized stopping of the engine, characterized in that the method comprises a step of storing data relating to the number of starts of the engine of the vehicle, and in that the energized stopping of the engine is authorized at least according to said stored data.

According to one implementation of the method, the method comprises a step of storing data relating to the elapsed energized time T of the vehicle since it was put into service, said energizing corresponding to the active state of the energizing member, and the energized stopping of the engine is authorized at least according to said stored data.

According to one implementation of the method, the method comprises a step of calculation of the number D of starts of the vehicle since it was put into service over the elapsed energized time T of the vehicle since it was put into service and a step of comparison of the result of the calculation with a stored predetermined threshold value, the energized stopping of the engine being authorized at least when the result of the calculation is below the stored predetermined threshold value.

According to one implementation of the method, the method comprises a step of storing each time value relating to the elapsed energized time between two successive starts of the heat engine, a step of calculation of the sum of the last n stored time values with the time value relating to the elapsed energized time since the current start, n being an integer number greater than or equal to 1, a step of comparison of said calculated value with a predefined threshold value, the energized stopping of the engine being authorized at least according to the results of the comparison.

BRIEF DESCRIPTION OF THE DRAWINGS

The invention will be well understood on reading the following description of exemplary embodiments, with reference to the attached drawings in which.

DETAILED DESCRIPTION

As mentioned above, the invention relates to a wheeled vehicle 1 equipped with an automatic engine stop functionality. In the example illustrated, the vehicle 1 is a cherry picker 1 allowing a person to work at elevation, but the invention can be applied to any type of wheeled vehicle without departing from the scope of the invention. The vehicle 1 will therefore be called the cherry picker 1 hereinafter in the description.

This cherry picker 1 comprises a wheeled chassis 2.

This cherry picker 1 also comprises a heat engine 4 borne by the chassis 2, an electric starter 5 of said heat engine 4 and at least one member, in this case here two members 61, 62 for actuating the starter 5.

In the example represented, the chassis 2 is equipped with four wheels 33, of which at least two are generally drive wheels.

In fact, the cherry picker comprises means 3 for moving the chassis 2 over the surface of the ground using wheels 3. According to a particular aspect, the heat engine 4 is linked to the wheels via a transmission 25 to form means 3 for moving the chassis 2 on the ground. It is also possible to provide for the electric starter 5 of said heat engine 4 and possibly said at least one member 61, 62 for actuating the starter 5 to form part of the moving means 3.

The heat engine 4 is thus linked to the wheels 33 by a transmission 25, preferably hydrostatic, which here comprises a hydrostatic pump and hydraulic motors each associated with a so-called drive wheel 33. The detail of this transmission will not be described in detail because such a transmission is well known to those skilled in this art.

An electricity generator 20, such as an electric motor, can be associated with the heat engine 4 and a module 21 for determining the activated state of the generator can be provided on the control unit 11 which will be described hereinbelow.

The electric starter 5 of the heat engine 4 is supplied by a battery 15 that can be recharged via an alternator which can be the electricity generator 20 described above when the heat engine 4 is operating. An indicator 16 of the level of charge of the battery 15 is provided. This level-of-charge indicator 16 can be formed by a member, such as a sensor for measuring the level of charge, that is to say a charge or discharge characteristic or a voltage at the terminals of the battery. Such measurement information can be addressed to the control unit 11 described hereinbelow. As a variant, this indicator 16 of the level of charge of the battery 15 can be formed by a module incorporated in the control unit.

The actuation of the starter 5 of the heat engine 4, in the sense of a start of the heat engine 4, can be performed, in the example represented, using either one of the two actuation members 61, 62 which, each time, take the form of a button whose depression makes it possible to send an electrical signal to the starter. The position of these actuation members will be described hereinbelow.

The cherry picker 1 also comprises a platform 8 on which the operator wanting to work at elevation can stand. This platform 8 which comprises a floor and a guard rail surrounding the floor is equipped with a control console 10 equipped with controls 26 as is known per se. The detail of this control console 10 will be provided hereinbelow.

The cherry picker 1 also comprises means 9 for lifting the platform 8 relative to the chassis 2. These lifting means 9 comprise a lifting arm 91 disposed between a zone 30 of connection to the platform 8 and the chassis 2. This lifting arm 91 can be formed by one or more arm section articulated to one another as in the example represented. This arm can be a telescopic or non-telescopic arm.

For the switch from the low position to the high position of the arm, the cherry picker comprises a hydraulic pump 23 coupled to the heat engine 4 and hydraulic actuators, in this case cylinders 22, disposed between the arm and the chassis, and between the sections of arm when the arm is in different sections.

These cylinders 22 are supplied with hydraulic fluid using the hydraulic pump 23 via a hydraulic distributor 24, the displacement of which is controlled using signals supplied from said control unit 11 described hereinbelow.

Sensors 32 can be disposed at the cylinders and make it possible to identify the position of the piston of the cylinder and consequently the high or low position of the lifting arm 91. These sensors 32 can also be disposed at each end-of-travel abutment with which the arm is equipped and that embodies the low position of the arm. The data from the position sensors 32 representative of the position of the arm can be addressed to the control unit 11 which will be described hereinbelow.

Figure 1:
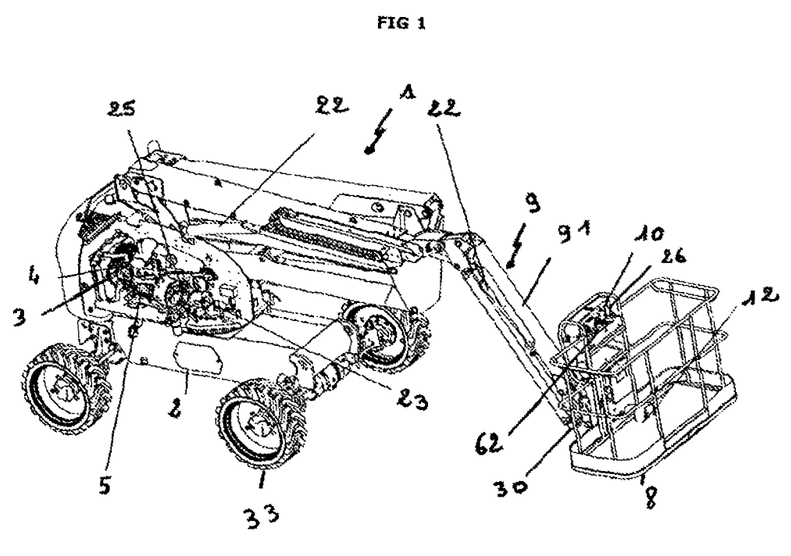
FIG. 1 represents a perspective view of a vehicle, in this case a cherry picker according to the invention in transport configuration, some of the elements of the bodywork having been eliminated to view the interior of the cherry picker.
Figure 2:
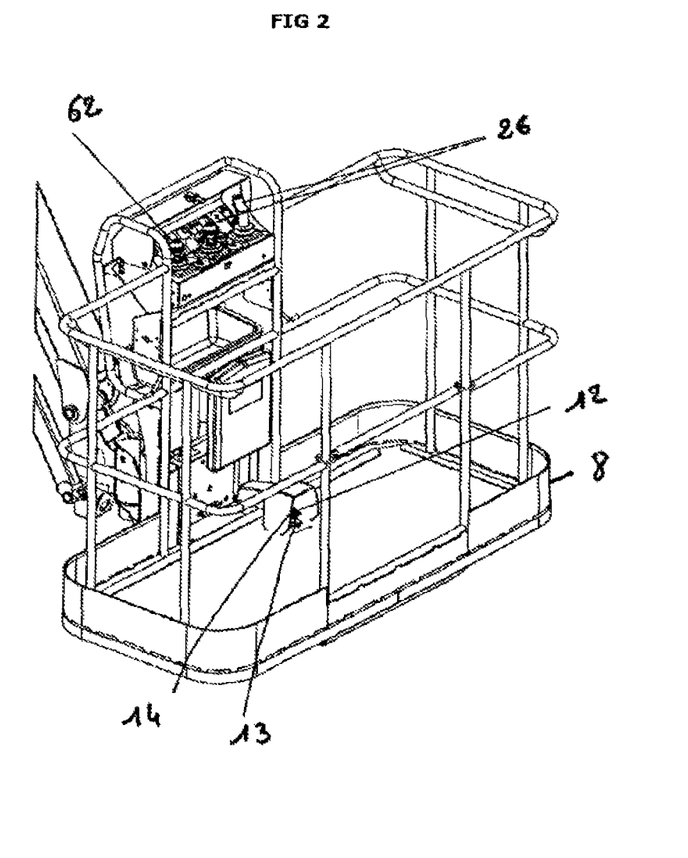
FIG. 2 represents a perspective view of a platform of a cherry picker according to the invention.
Figure 3:
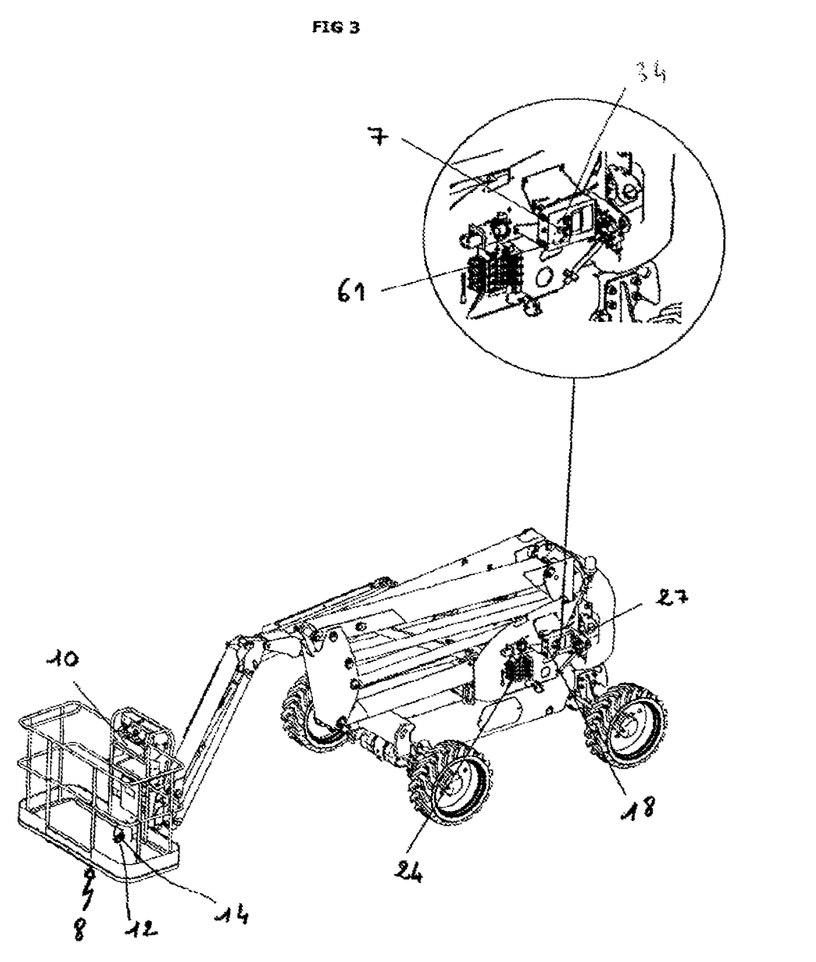
FIG. 3 represents a perspective view of a cherry picker according to the invention in transport configuration with a detail view of the control station with which the chassis is equipped.
Figure 4:
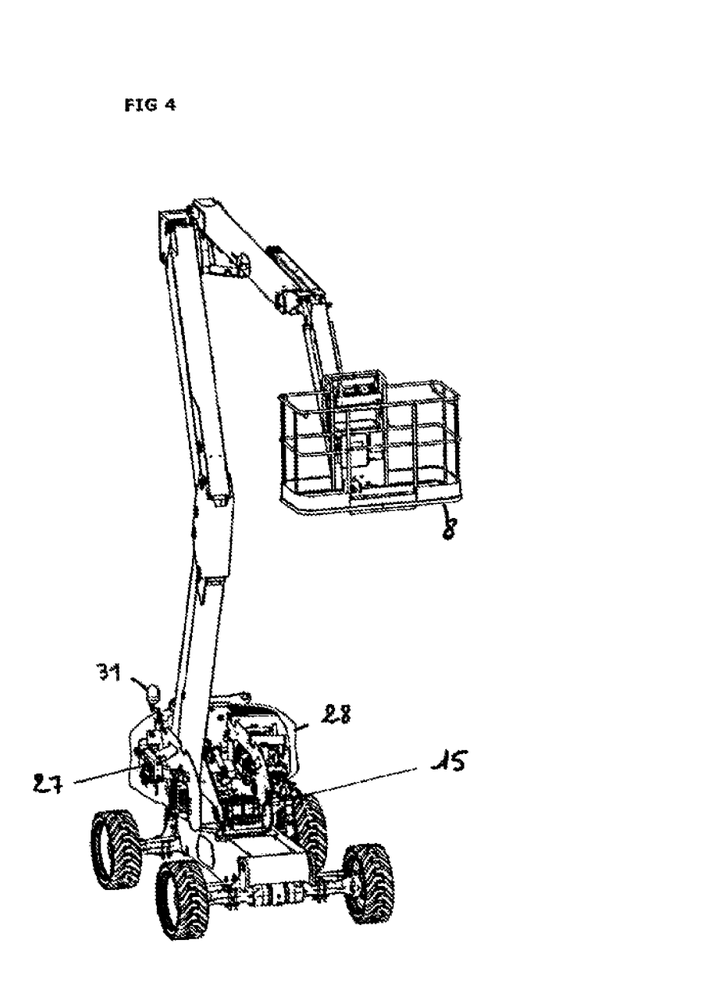
FIG. 4 represents a perspective view of a cherry picker according to the invention in working configuration.
Figure 5:
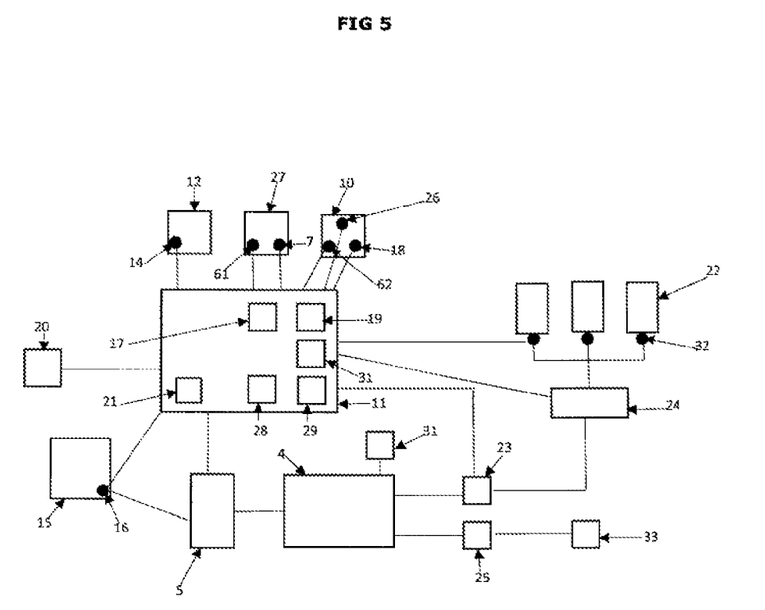
FIG. 5 represents, in the form of functional blocks, some of the elements of the cherry picker.

The low position of the arm, as illustrated in FIG. 3, in which the arm is lowered to the maximum and folded down, and the platform 8 is situated in proximity to the ground, is called the transport configuration of the cherry picker, while the high position of the arm, as illustrated in FIG. 4, in which the lifting arm 91 is extended and the platform 8 is away from the ground, is called the working configuration of the cherry picker.

The position sensors 32 can therefore detect at least the working configuration of the cherry picker 1 and address these data to the control unit 11.

It should be noted that, in the case of a telescopic arm, the transport configuration of the cherry picker corresponds, in addition to the lowered position of the arm, to the retracted position of the telescope.

The cherry picker 1 also comprises, as mentioned above, a control unit 11. Said control unit 11 takes the form of an electronic and computing system which comprises, for example, a microprocessor and a working memory. According to a particular aspect, the control unit can take the form of a programmable logic controller.

In other words, the functions and steps described can be implemented in the form of a computer program or via hardware components (for example, programmable gate arrays). In particular, the functions and steps applied by the control unit or its modules can be performed by instruction sets or computer modules implemented in a processor or controller or be implemented by dedicated electronic components or components of FPGA or ASIC type. It is also possible to combine computing parts and electronic parts.

When it is specified that the unit or means or modules of said unit are configured to perform a given operation, this means that the unit comprises computer instructions and corresponding execution means which make it possible to perform said operation and/or that the unit comprises corresponding electronic components.

This control unit 11 can receive input data and deliver output data. This control unit 11 is configured to control the lifting means 9, and preferably the displacement means 3, according to the data supplied by the control console 10 disposed on the platform.

In the example represented, the cherry picker comprises, in addition to the control console 10, a control station 27 mounted on the chassis and called ground control station 27. This ground control station 27 makes it possible to assist an operator in difficulty on the platform and perform operations on the cherry picker without having to climb onto the platform 8.

The cherry picker 1 also comprises a member 7 for energizing the control unit 11. This energizing member 7 can switch from an inactive state to an active state and vice versa. This cherry picker energizing member 7 here takes the form of an ignition key disposed in the control station 27 of the chassis 2. This key is a rotary key that can switch by rotation from an inactive state to an active state and vice versa. The switch to active position of the key ensures the energizing at least of the control unit 11.

This ground control station 27 is also equipped with one of the members for actuating the starter 5 as described above. This member 61 for actuating the starter 5 is formed here by a simple start button. This ground control station 27 can also be equipped with arm and chassis movement control. The control unit 11 is also configured to control the lifting means 9 and the displacement means 3 according to the data supplied by the ground control station 27.

This ground control station 27 is also equipped with an activatable/deactivatable member 18 for controlling the cold starting of the heat engine 4. This member 18 takes the form of a button that can be activated by manual actuation and can be deactivated automatically either beyond a predetermined activation period, or when, for example, the temperature of the oil of one of the hydraulic circuits such as the oil of the circuits of the lifting means or of the displacement means reaches a predetermined temperature.

This cold start control member 18 allows the operator to know when the cherry picker 1 can operate optimally at the heat engine 4 level.

A module 19 for determining the activated state of the cold start control member 18 is provided on the control unit 11. This module allows the control unit 11 to have information relating to the activated state of the cold start control member 18.

The control console 10 is equipped, for its part, with the second member 62 for actuating the starter 5 of the heat engine 4. This member 62 for actuating the starter 5 of the heat engine 4 can be used, for example, in the event of a cold start of the engine or after a stop triggered following the actuation of an emergency stop button with which the console is equipped, the actuation of said stop button generating the stopping of the heat engine and the cutting of the supply to a large number of electrical members with which the cherry picker is equipped.

The control console 10 also comprises one or more controls 26 in the form of levers also called joysticks. It is understood that a control can comprise several control members. The control or controls 26 comprise a control of at least the lifting means 9 making it possible to control the lifting of the platform 8 using the heat engine 4. Provision can be made for the control or controls 26 to comprise only a control of the lifting means 9, or even a control of the lifting means 9 of the platform 8 and a control of the displacement means 3 for controlling the displacement of the wheels. It is thus possible, from the control console, to control only the lifting of the arm, or the lifting and the displacement on the ground of the vehicle. The number of levers can therefore vary. It is for example possible to provide a first lever for the actuation of the lifting of the lifting arm 91, a second lever for controlling the forward/reverse operation of the wheeled chassis, and, in the case where the arm is mounted on a swiveling turntable of the chassis 2, as in the example represented, a third lever for controlling the rotation of the turntable. All the movements of these levers can be measured by transducers and supplied to the control unit 11 in the form of electrical signals. As a variant, the second and third levers can be eliminated.

As another variant, the control of the lifting means 9 of the platform and of the ground displacement means 3 of the chassis can be applied using one and the same lever.

The platform 8 also comprises a member 12 for activating/deactivating at least the control 26 of the lifting means 9 of the platform present on the control console. Hereinafter in the description, for simplicity, reference is made to the activating/deactivating member 12.

According to a particular aspect, said activating/deactivating member 12 makes it possible not only to activate/deactivate at least the control of the lifting means 9 of the platform, but also to activate/deactivate the control of the ground displacement means 3 of the chassis when this control is present on the control console.

This member 12 for activating/deactivating at least the control 26 of the lifting means 9 and, possibly, the control of the ground displacement means 3 of the chassis when present, is mounted to be movable between an inactive position in which the control or controls 26 of the control console 10, that is to say at least the control 26 of the lifting means 9 or at least the control 26 of the lifting means 9 and the control 26 of the ground displacement means 3 of the chassis, are deactivated or inactive, and an active position in which the control or controls 26 of the control console 10, that is to say, once again, at least the control 26 of the lifting means 9 or at least the control 26 of the lifting means 9 and the control 26 of the ground displacement means 3 of the chassis are activated or active. Deactivated should be understood to mean that an action of the operator on the control or controls has no effect, the control command not being transmitted to the control unit 11. Conversely, activated should be understood to mean that an action of the operator on the control or controls can be transmitted to the control unit 11.

The activating/deactivating member 12 is equipped with means 13 for return to the inactivate position and can switch from the inactive position to the active position under the action of a thrust exerted on said activating/deactivating member 12 against the return means 13. These return means 13 can be formed by a spring or by any other elastically deformable means.

In the examples represented, the activating/deactivating member 12 is a foot pedal borne by the platform 8. This pedal is disposed on the floor of the platform 8 away from the control console 10 which, for its part, is placed at operator hand height.

The operator can thus activate the pedal when his or her hands are used for work at elevation. This pedal is equipped with an indicator 14 of the active or inactive position of the pedal, the position data of said indicator being transmitted to the control unit 11.

This indicator 14 of the active or inactive position can be formed by a simple contactor disposed on the pedal or by a transducer that can measure the displacement of the pedal and supply an indication of said movement of the pedal to the control unit in the form of electrical signals.

As the above description illustrates, the control unit 11 can therefore receive input data which can notably be either logical starting, stopping, switching-off, switching-on or lifting information, or measurements from sensors and transmit output data which can be control instructions for the actuators, indicative information, indicator lamps or the like, these input and output data being dependent on the operating mode of the cherry picker.

The cherry picker 1 comprises a so-called economical operating mode in which, in the activated state of the energizing member 7 and in the started state of the engine, the control unit 11 is configured to allow the heat engine 4 to be stopped automatically, that is to say without actuation of the energizing member 7, said stop being called energized stopping of the engine 4. This energized stopping of the heat engine 4, that is to say with the energizing member 7 remaining activated, makes it possible to retain a supply at least for the control unit 11.

To allow the energized stopping of the heat engine 4 in this economical operating mode, it is necessary, when this economical operating mode is an activatable/deactivatable operating mode, that this operating mode be activated. The activation can be done automatically after energizing and before or after the first start of the engine. It can also be controlled by the operator using a button 34 situated in the bottom control station 27.

However, this activation/deactivation is dependent on the level of charge of the battery and the economical operating mode can be deactivated when the level of charge of the battery 15 supplied by the level-of-charge indicator 16 is insufficient.

In the example represented, this economical mode can be activated only in the working configuration of the cherry picker. In this economical operating mode, the control unit is therefore configured to provoke, in preestablished conditions, the energized stopping of the heat engine 4. This control unit 11 is also configured to, in the energized stopped state of the engine, provoke, in pre-established conditions, a so-called automatic start of the engine, that is to say a start of the heat engine 4 without actuation of the member or members 61, 62 for actuating the starter 5 when the starter 5 comprises several actuation members as is the case in the example represented.

In the example represented, the control unit 11 is configured to control the starting of the heat engine 4 using the member 12 for activating/deactivating the control 26 of the lifting means 9, that is to say the dead-man's pedal.

Figure 7:
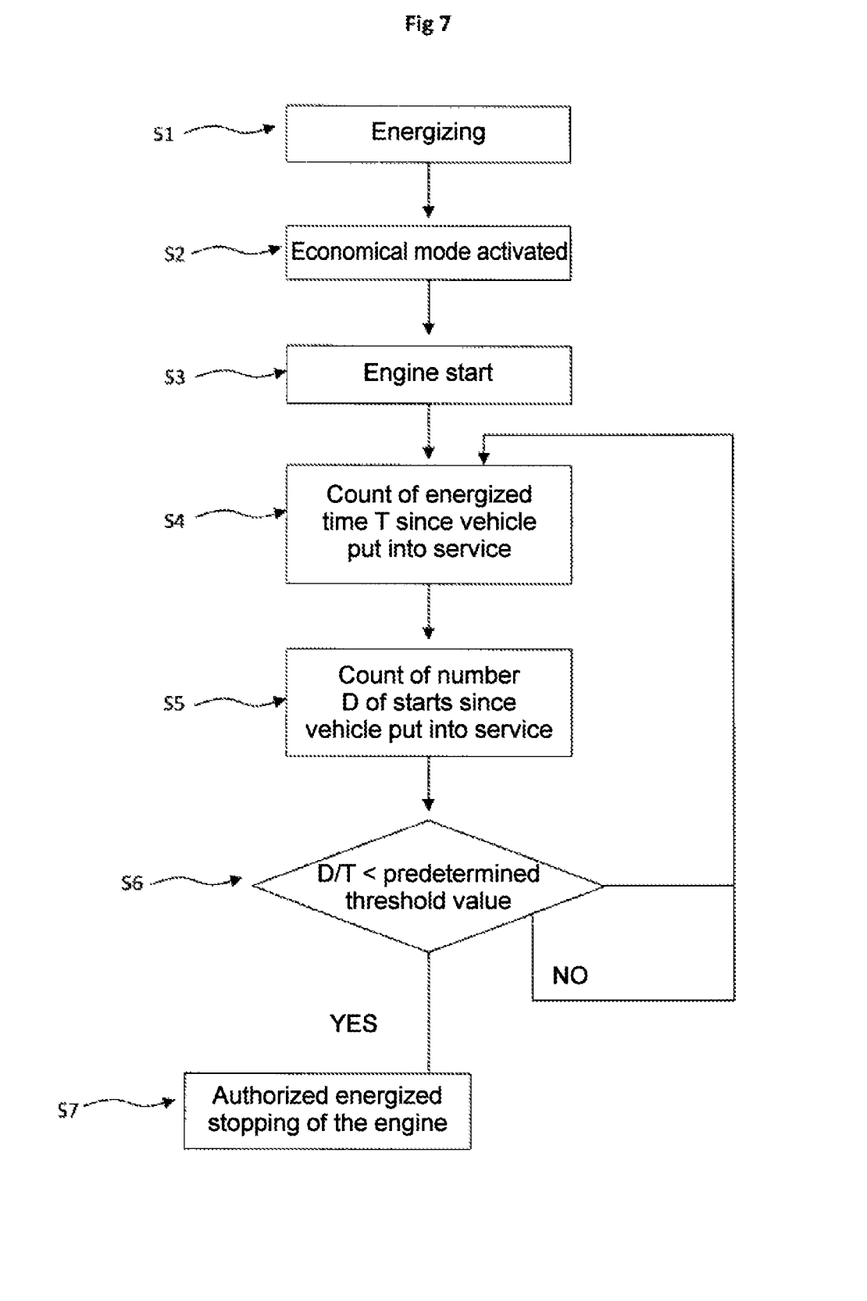
FIG. 7 represents, in flow diagram form, a procedure for authorizing energized stopping of the engine.
Figure 8A:
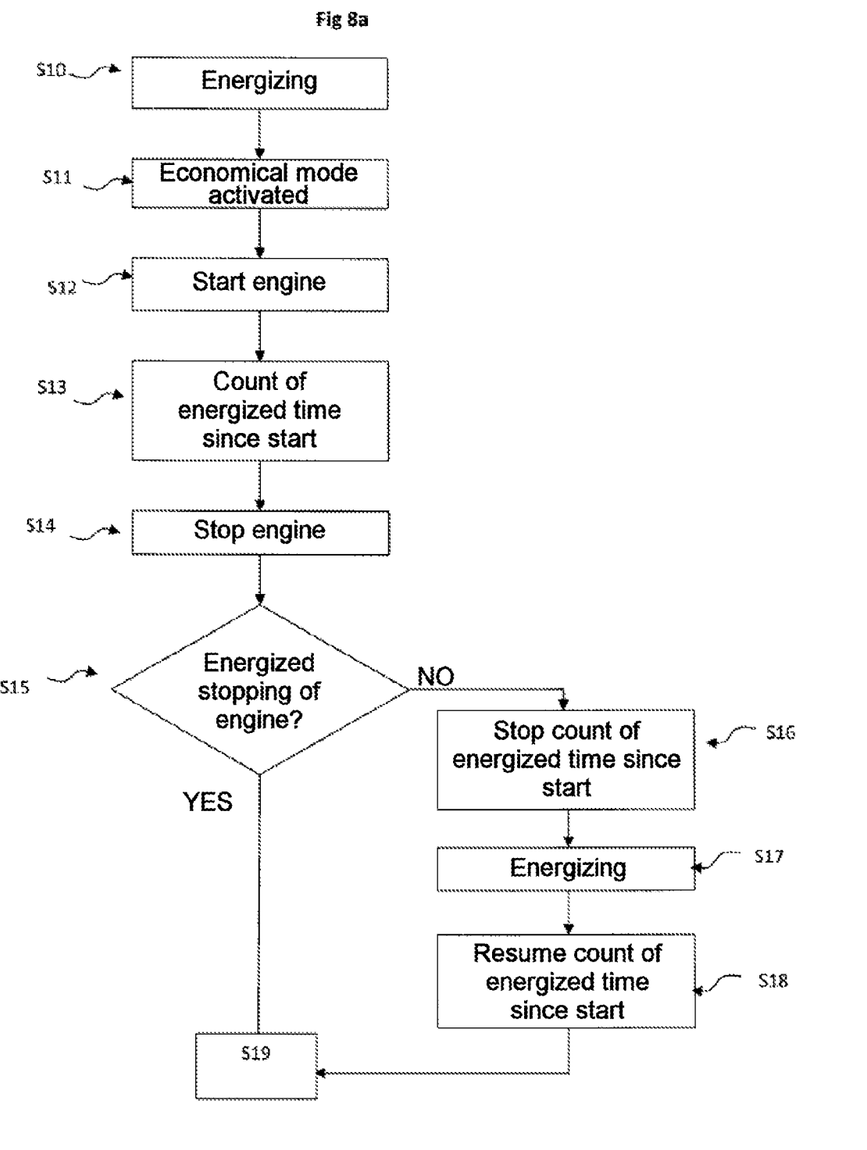
FIGS. 8a and 8b represent, in flow diagram form, a procedure for authorizing energized stopping of the engine.
Figure 8B:
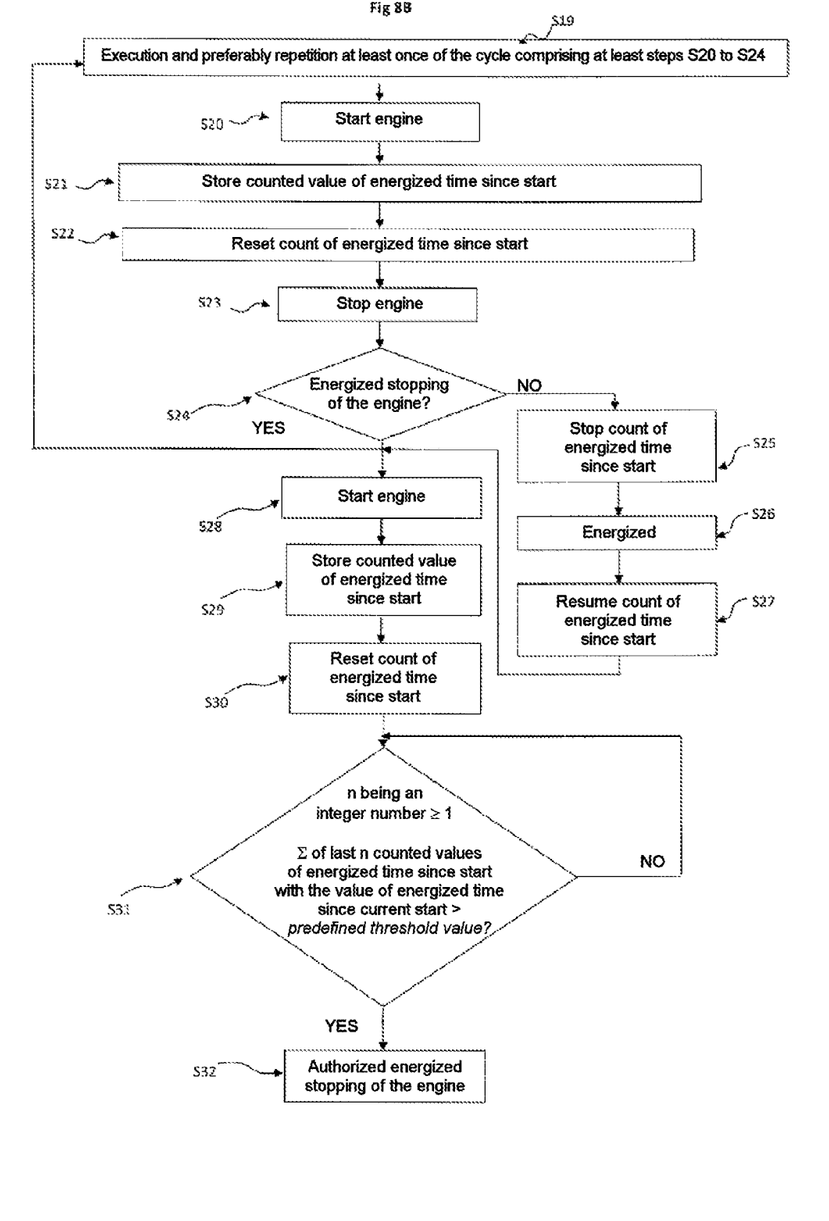

To allow the engine to be stopped when energized, it is necessary for the stopping of the engine to be authorized as FIGS. 7, 8a and 8b illustrate. To this end, the cherry picker 1 comprises a memory 28 for storing data relating to the number of starts of the heat engine 4 of the cherry picker. The control unit 11 is configured to, in the economical operating mode of the cherry picker, allow or prohibit the energized stopping of the engine 4 at least according to said stored data. The start information can be obtained either using a sensor or voltage information taken at the terminals of the electricity generator, also called alternator, associated with the heat engine 4, or using information relating to the rotation of the engine shaft, this information being able to be obtained using a sensor positioned at the level of the engine shaft or of the shaft of the electricity generator. The memory 28 can therefore thus store a datum D corresponding to the number D of starts of the engine of the cherry picker 1 since it was put into service.

The cherry picker also comprises a memory 29 for storing data relating to the elapsed energized time T of the cherry picker 1 since it was put into service. This energizing of the cherry picker 1 corresponds to the active state of the energizing member 7. The control unit 11 is configured to, in the economical operating mode of the cherry picker 1, authorize or prohibit the energized stopping of the engine 4 at least according to said stored data. To obtain information relating to the elapsed energized time T of the cherry picker since it was put into service, the cherry picker comprises an internal clock equipped with a cell to operate permanently. Time information can be supplied by the clock to the control unit 11. This control unit receives, in parallel, information relating to the actuation of the energizing member 7, whether it be in the sense of a switch from the active state to the inactive state or in the sense of a switch from the inactive state to the active state. It is thus possible for the control unit to calculate, from the time information and the information relating to the actuation of the energizing member 7, the energized time T of the vehicle since it was put into service. In practice, the control unit is configured to:

calculate the number D of starts of the cherry picker 1 over the elapsed energized time T of the vehicle 1 since it was put into service, i.e. the operation D/T compare the result of the calculation with a stored predetermined threshold value, and authorize the energized stopping of the engine 4 at least when the result of the calculation is below the stored predetermined threshold value, as the steps S1 to S7 of FIG. 7 illustrate. Thus, if the energized time T is 1200 hours, and the number D of starts is 6000, D/T is equal to 5, i.e. 5 starts per hour. If the chosen threshold value corresponding to a number of starts per unit of time is equal to 3, that is to say 3 starts per hour, then the calculated value (5) is above the stored threshold value (3) and the energized stopping of the engine is not authorized.

The steps S4 of counting of the time T, S5 of the counting of the number D of starts and the step S6 of comparing the value D/T with a predetermined threshold value are repeated until D/T is below the predetermined threshold value to authorize the energized stopping of the engine.

The cherry picker also comprises a memory 31 for storing each time value relating to the elapsed energized time between two successive starts of the heat engine 4. The control unit 11 is configured to:

calculate the sum of the last n stored time values with the time value relating to the elapsed energized time since the current start, compare said calculated value with a predefined threshold value, and, authorize the energized stopping of the engine 4 at least according to the result of the comparison, n being an integer number greater than or equal to 1.

Figure 6:
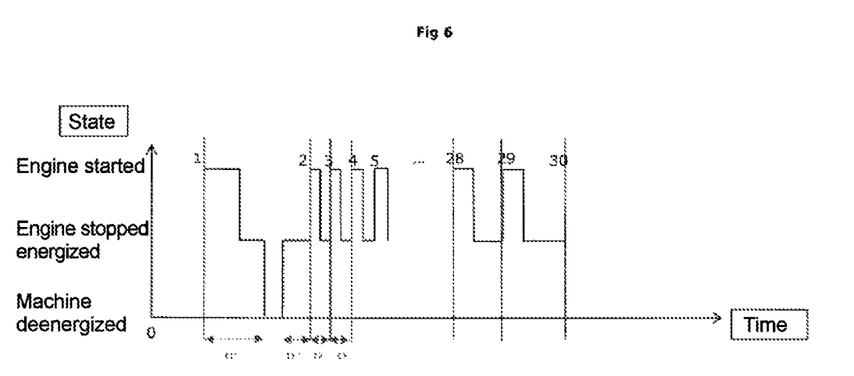
FIG. 6 represents a timing diagram illustrating the method for calculating the elapsed energized time between two successive starts.

An example of implementation is described in FIGS. 6, 8a and 8b.

FIG. 6 illustrates the values t1, t2, t3, . . . tn that can be stored in the memory 31. Thus, the timing diagram of FIG. 6 illustrates the state (started/stopped when energized/stopped when not energized) of the engine 4 on the y axis and the time on the x axis, the FIGS. 1, 2, 3 . . . to 30 each time illustrating a start. Thus, from the start no. 1, the cherry picker is energized for a first time period t1'. This time period t1' comprises a time period during which the engine is started and a time period during which the engine is stopped energized. The value counted at the end of this first time period is stored temporarily. The energizing member 7 is brought to the inactive state and the time is then no longer counted. As soon as the energizing member is once again in the active state, the counting of the time is resumed without interruption until the start no. 2 in FIG. 6 because the vehicle is energized throughout this period t1". The first counted time value stored in the memory 31 is therefore the time value corresponding to the sum of the periods t1' and t1", t1" corresponding to the time which has elapsed between the energizing following the start no. 1 and the start no. 2. This time value corresponding to the sum t1' and t1" is called t1.

After the start numbered 2 in FIG. 6, the engine operates for a certain time period then is stopped energized for a certain time until a start numbered 3 in FIG. 6. This period of energized operation which elapses between the start no. 2 and number 3 is represented by t2 in FIG. 6. The duration t2 of this time period is stored in the memory 31 and added to the value of t1 corresponding to the sum of t1' and t1".

The method proceeds likewise for the subsequent starts. On each start, the count is reset to calculate only the energized time which elapses between two successive starts. Thus, the elapsed energized time values of the cherry picker between two successive starts are stored. This storage is applied only for the last n values counted, n being an integer number greater than 1. Thus, in the example represented in FIG. 6, n is equal to 30. On the start 31, the time value t30 corresponding to the energized operating time between the starts 30 and 31 is stored and the value t1 is deleted on the start no. 32. The storage is therefore applied in a sliding manner to retain only the last n values stored and the energized time value currently being counted and corresponding to the energized time of the vehicle elapsed since the last current start.

The sum of the n time values t1+t2+ . . . t30 thus calculated added to the time value currently being counted is compared to a predetermined threshold time value. If the calculated value is greater than the predetermined threshold time value, the energized stopping of the engine is authorized.

Thus, in the example represented, if the sum of t1 to t30 in addition to the time value currently being counted is less than a time which corresponds to the chosen threshold value, then the energized stopping of the engine is not authorized. Once again, an internal clock is used for the counting of the energized operating time between two successive starts. The cherry picker therefore comprises an internal clock for help in counting the energized operating time between two successive starts. The time information from the clock is addressed to the control unit in parallel with the information relating to the starting of the engine and the operation of the energizing member 7.

The steps S10 to S32 illustrate, in flow diagram form, an example of this process. Thus, in the step S10, the cherry picker is energized by actuation of the energizing member 7 and switching of said member to active position.

In the step S11, the economical mode is activated by default and by actuation of a button by the driver of the cherry picker.

In the step S12, the driver starts the engine using the start button 62.

In the step S13, the counting of the energized time, that is to say energized operation of the cherry picker, starts.

In the step S14, the engine is stopped. If the stoppage is not an energized stopping of the engine, that is to say that the energizing member 7 has been actuated to switch to the inactive position, then the process goes on to the steps S16 to S18.

The counting is stopped in the step S16 until a new energizing takes place in the step S17. This energizing of the cherry picker is applied by actuation of the energizing member 7 which switches to the energizing active position.

The counting of the energized time is then resumed in the step S18 to go onto the step S19. If the stopping of the engine is applied when energized in the step S15, then the process goes directly to the step S19.

From the step S19, the steps S20 to S24 are executed at least once.

Thus, in the step S20, the engine is started and in the step S21 the count value of the energized time since the start applied in the step S12 or in the step S20 of the prior cycle when a cycle of steps between S20 and S24 has already been executed, is stored in the memory 31.

In the step S22, the counting of the energized time is reset to allow a new time value to be counted.

In the step S23, the engine is stopped.

Once again, in the step S24, there is a check as to whether the stopping of the engine that has been applied is an energized stop. If the stop is a stop when not energized, the count is stopped in the step S25.

Once the energizing is applied in the step S26, the counting is resumed in the step S27.

This cycle of the steps S20 to S24 with, possibly, the steps S25 to S27 depending on the type of stop, can be repeated a certain number of times.

In the step S28, an engine start is applied and in the step S29, the counted value of the energized time of the cherry picker since the start preceding the start applied in the step S28 is stored.

In the step S30, the counting of the energized time is reset, that is to say reset to zero to perform a new count from the start that has just been applied.

A test is then performed in the step S31. In this test, the last n counted values of the energized time are added to the counted value of the energized time since the current start and the result of this operation is compared to a predefined threshold value. Thus, for example, if the value of the calculated time is greater than the predetermined value, then the energized stopping of the engine is authorized. Otherwise, it is prohibited.

It should be noted that the conditions:
D/T below a predetermined threshold value and
sum of the last n energized time values counted since the start with the energized time value since the current start above a predefined threshold are generally cumulative conditions. Thus, the stopping of the engine when energized is authorized only if the two conditions are fulfilled.

In this economical operating mode, once the energized stopping of the engine is authorized, the control unit is configured to, in predefined conditions, control the stopping of said engine automatically, that is to say without actuation of the energizing member 7 by the operator.

The cherry picker therefore comprises means for establishing a request to activate the energized stopping of the heat engine based on vehicle stress criteria, and the control unit 11 is configured to control this energized stopping when the request is established. These stress criteria are chosen, as the description below illustrates, from the non-exhaustive group comprising at least:
a criterion representative of the level of charge of the battery,
criterion representative of the deactivation of the cold start control member 18,
a criterion representative of the deactivation of the electricity generator 20,
a criterion representative of the cherry picker in working configuration,
a criterion representative of the presence of an operator on the platform,
a criterion representative of the position of the activating/deactivating member 12.

These criteria apply here cumulatively. However, the number of criteria can be reduced according to the desired level of safety or comfort. Thus, the criterion relating to the deactivation of the cold start control member 18 and the criterion relating to the deactivation of the electricity generator 20 can be eliminated.

The control unit is therefore configured to, in working configuration of the cherry picker, in the activated state of the economical operating mode, control the energized stopping of the heat engine 4 at least according to data supplied by the indicator 14 of the position of the activating/deactivating member 12, the control unit being configured to control the energized stopping of the engine at least if the activating/deactivating member is in inactive position.

Likewise, the control unit is configured to, in working configuration of the cherry picker, in the activated state of the economical operating mode, control the energized stopping of the heat engine 4 at least according to the presence or absence state determined by the presence determination module 17, the control unit being configured to control the energized stopping of the engine at least if the present state is detected. This presence determination module 17 disposed on the control unit is configured to check that the last instructions received for the control of the engine or of the lifting arm originate from the control console.

Optionally, the control unit configured to, in working configuration of the cherry picker, in the activated state of the economical operating mode, control the energized stopping of the heat engine 4 according to the activated/deactivated state of the cold start control member 18 of the heat engine, the control unit being configured to control the energized stopping of the heat engine 4 at least if the control member 18 is in the deactivated state.

Finally, again optionally, the control unit is configured to, in working configuration of the cherry picker, in the activated state of the economical operating mode, control the energized stopping of the heat engine 4 at least according to data supplied by the module 21 for determining the activated/deactivated state of the electricity generator 20, the control unit being configured to control the energized stopping at least if the electricity generator 20 is in the deactivated state, that is to say inactive.

Thus:
if the level of charge of the battery is sufficient,
if the cold start control is deactivated,
if the generator is deactivated,
if the working configuration is activated,
if presence on the platform is confirmed,
and if the activating/deactivating member 12 is in inactive position, then the energized stopping of the engine is controlled by the control unit.

Once the energized stopping of the engine is obtained, in this economical operating mode, a start of the heat engine will be able to obtained by activation of the member 12 for activating/deactivating the control of the lifting means 9 without actuation of the members 61, 62 for actuating the starter 5.

In practice, the driver of such a vehicle can therefore, once he or she is on the platform of the cherry picker, manage the functionality of energized stopping and energized starting of the engine using only the member 12 for activating/deactivating the control 26 of the lifting means, all the predefined conditions above making it possible to authorize this stopping and this starting in optimal conditions for good operation of the cherry picker without premature wear of the engine or of the starter.

The invention claimed is:
1. A wheeled vehicle comprising
a chassis, a heat engine borne by said chassis, a starter of said engine and at least one member for actuating said starter,
a control unit,
a member for energizing at least the control unit, said energizing member being able to switch from an active state to an inactive state and vice versa,
said vehicle comprising an economical operating mode in which, in the activated state of the energizing member and in the started state of the engine, the control unit is configured to allow the engine to be stopped automatically without actuation of the energizing member, said stopping being called energized stopping of the engine,
wherein the wheeled vehicle comprises a memory for storing data relating to the number of starts of the heat engine of the vehicle and in that the control unit is configured to, in the economical operating mode of the vehicle, allow or prohibit the energized stopping of the engine at least according to said stored data, wherein the wheeled vehicle comprises the memory for storing each time value relating to the elapsed energized time between two successive starts of the heat engine and in that the control unit is configured to, n being an integer number greater than or equal to 1, calculate the sum of the last n stored time values with the time value relating to the elapsed energized time since the current start, compare said calculated value with a predetermined threshold value, and, allow the energized stopping of the engine at least according to the result of the comparison.

2. The wheeled vehicle as claimed in claim 1, wherein, in the economical operating mode, the control unit is configured to, in the energized stopped state of the engine, start the engine without actuation of the at least one member for actuating the starter.

3. The wheeled vehicle as claimed in claim 1, wherein the wheeled vehicle comprises the memory for storing data relating to the elapsed energized time T of the vehicle since it was put into service, said energizing of the vehicle corresponding to the active state of the energizing member, and in that the control unit is configured to, in the economical operating mode of the vehicle, allow or prohibit the energized stopping of the engine at least according to said stored data.

4. The wheeled vehicle as claimed in claim 3, wherein the control unit is configured to:

calculate the number D of starts of the vehicle since it was put into service over the elapsed energized time T of the vehicle since it was put into service, compare the result of the calculation with a stored predetermined threshold value, and allow the energized stopping of the engine at least when the result of the calculation is below the stored predetermined threshold value.

5. The wheeled vehicle as claimed in claim 1, wherein the energizing member of the vehicle is a key disposed on the chassis, this key being a rotary key that can switch by rotation from an inactive state to an active state and vice versa.

6. The wheeled vehicle as claimed in claim 1, wherein the chassis is equipped with a control station and in that the or at least one of the members for actuating the starter is formed by a start button with which said station is equipped.

7. The wheeled vehicle as claimed in claim 1, wherein the vehicle is a cherry picker comprising:

in addition to the chassis bearing said heat engine, a platform, means for lifting the platform relative to the chassis, said lifting means comprising at least one telescopic or non-telescopic lifting arm disposed between a zone of connection to the platform and the chassis and mounted to be movable using the heat engine between a high position and a low position, a control console borne by said platform and equipped at least with a control for the lifting means, a member for activating/deactivating at least the control of the lifting means, said activating/deactivating member being mounted to be movable between an inactive position, in which at least the control of the lifting means is deactivated and an active position in which at least the control of the lifting means is activated, said activating/deactivating member being equipped with means for return to the inactive position, and being able to switch from the inactive position to the active position under the action of a thrust exerted on said activating/deactivating member against the return means, and an indicator of the active/inactive position of the activating/deactivating member, and in that the control unit is configured to control the lifting means according at least to the data supplied by said control console, and in that said cherry picker has two configurations, namely a transport configuration and a working configuration, said cherry picker being in transport configuration in the low position of the arm and retracted position of the arm in the case of a telescopic arm, and in that, in the working configuration of the cherry picker, and in the economical operating mode, the control unit is configured to, in the authorized state of energized stopping of the engine, control the energized stopping of the heat engine at least according to the data supplied by said indicator of the active/inactive position of the member for activating/deactivating at least the control of the lifting means.

8. The wheeled vehicle as claimed in claim 7, wherein, in the working configuration of the cherry picker and in the economical operating mode, in the energized stopped state of the heat engine, the control unit is configured to control the starting of the heat engine using the activating/deactivating member of at least the control of the lifting means, by switching of the activating/deactivating member from the inactive position to the active position, without actuation of the member or members for actuating the starter.

9. The wheeled vehicle as claimed in claim 7, wherein the control unit comprises a presence determination module configured to determine the presence or absence state of a person on the platform according to data supplied by the control console and in that, in the working configuration of the cherry picker, in the economical operating mode, the control unit is configured to, in the authorized state of energized stopping of the engine, control the energized stopping of the heat engine at least according to said state determined by the presence determination module.

10. The wheeled vehicle as claimed in claim 1, wherein the vehicle comprises an activatable/deactivatable member for controlling the cold starting of the heat engine and a module for determining the activated/deactivated state of said control member, this control member being able to be activated by manual actuation, and being able to be deactivated automatically, and in that, in the economical operating mode, the control unit is configured to, in the authorized state of energized stopping of the engine, control the energized stopping of the heat engine at least according to the activated/deactivated state of said cold start control member determined by said module.

11. The wheeled vehicle as claimed in claim 1, wherein the vehicle comprises at least one electricity generator, and a module for determining the activated/deactivated state of said electricity generator and in that, in the economical operating mode, the control unit is configured to, in the authorized state of energized stopping of the engine, control the energized stopping of the heat engine at least according to the activated/deactivated state of the electricity generator determined by said module.

12. The wheeled vehicle as claimed in claim 1, wherein the economical operating mode is an activatable/deactivatable mode and in that the vehicle comprises a member for activating and/or deactivating said mode.

13. A method for optimizing the stopping conditions of a wheeled vehicle comprising
- a chassis, a heat engine borne by said chassis, a starter of said engine and at least one member for actuating said starter,
- a control unit,
- a member for energizing at least the control unit, said energizing member being able to switch from an active state to an inactive state and vice versa, said vehicle comprising, in the activated state of the energizing member, and in the started state of the engine, an economical operating mode in which the control unit is configured to allow the engine to be stopped automatically without actuation of the energizing member, said stopping being called energized stopping of the engine, wherein the method comprises a step of storing of the data relating to the number of starts of the engine of the vehicle, and in that the energized stopping of the engine is authorized at least according to said stored data.

14. The method for optimizing the stopping conditions of a wheeled vehicle as claimed in claim 13, wherein the method comprises a step of storing of each time value relating to the elapsed energized time between two successive starts of the heat engine, a step of calculation of the sum of last n stored time values with the time value relating to the elapsed energized time since the current start, n being an integer number greater than or equal to 1, a step of comparison of said calculated value with a predefined threshold value, the energized stopping of the engine being authorized at least according to the results of the comparison.

* * * * *